United States Patent

Saucy

[15] 3,691,189
[45] Sept. 12, 1972

[54] PREPARATION OF ISOXAZOLYL 5-HYDROXYHEPTANOIC AND LACTONES

[72] Inventor: Gabriel Saucy, Essex Fells, N.J.

[73] Assignee: Hoffmann-La Roche Inc., Nutley, N.J.

[22] Filed: Jan. 5, 1970

[21] Appl. No.: 811

[52] U.S. Cl..........260/307 H, 260/347.7, 260/347.8, 260/566 A, 260/592, 260/594
[51] Int. Cl. ..............................................C07d 85/22
[58] Field of Search......................260/307 H, 343.5

[56] References Cited

UNITED STATES PATENTS 2,526,702  10/1950  Smith ........................260/344

Primary Examiner—Alex Mazel
Assistant Examiner—R. V. Rush
Attorney—Samuel L. Welt, Jon S. Saxe, Bernard S. Leon, William H. Epstein and George M. Gould

[57] ABSTRACT

Isoxazolyl-5-hydroxyheptanoic acid lactones which are intermediates useful in the total synthesis of steroids are prepared by reacting the corresponding isoxazolyl-5-oxo-heptanals with a metal alkoxide at a temperature in the range from about 20° C. to the reflux temperature of the reaction medium. Direct conversion of the precursor isoxazolyl-5-oxo-1-heptanol into the product lactone can be carried out in a single vessel by using a mixed reagent comprising an oxidizing reagent ( silver carbonate) and the said metal alkoxide at the same conditions as for the above last step reaction.

6 Claims, No Drawings

PREPARATION OF ISOXAZOLYL 5-HYDROXYHEPTANOIC AND LACTONES

BRIEF DESCRIPTION OF THE INVENTION

The present invention relates to novel processes useful in the preparation of isoxazolyl substituted lactones of the following formula

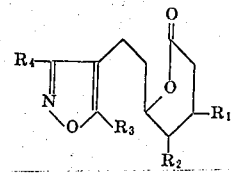

wherein $R_1$, $R_2$, and $R_4$ are selected from the group consisting of hydrogen and lower alkyl and $R_3$ is selected from the group consisting of hydrogen, lower alkyl, lower alkylaryl and aralkyl.

As used herein the term "lower alkyl" is meant to include both branched and straight chain hydrocarbon radicals having from one to seven, preferably one to four, carbon atoms. Examples of suitable lower alkyl groups include methyl, ethyl, propyl and butyl. Examples of suitable lower alkylaryl groups include tolyl, xylyl, and the like. The term "aralkyl" is meant to include groups such as phenyl lower alkyl, e.g., benzyl and phenylethyl.

The processes of the present invention utilized to prepare compounds of formula I above are more readily understood by reference to the following reaction scheme:

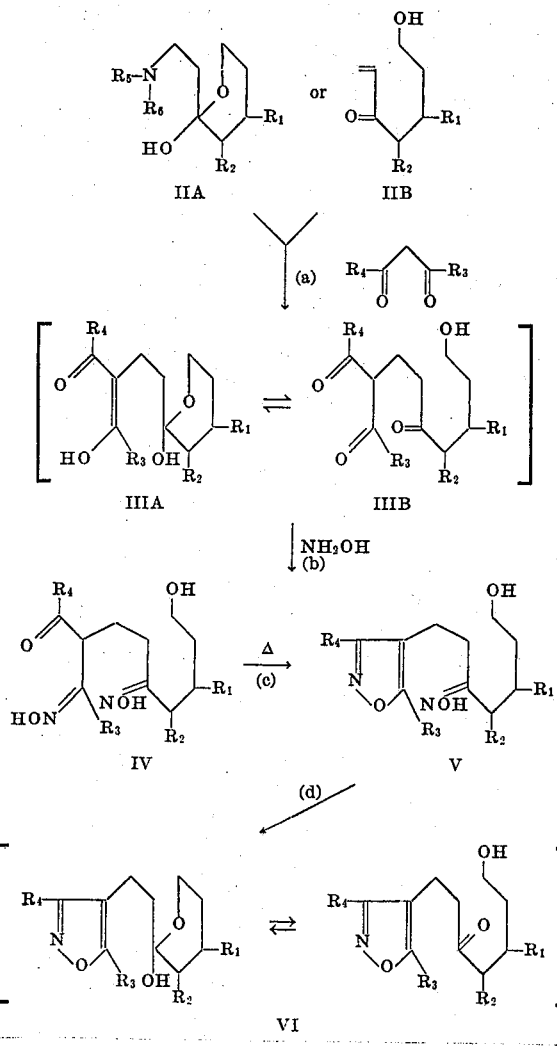

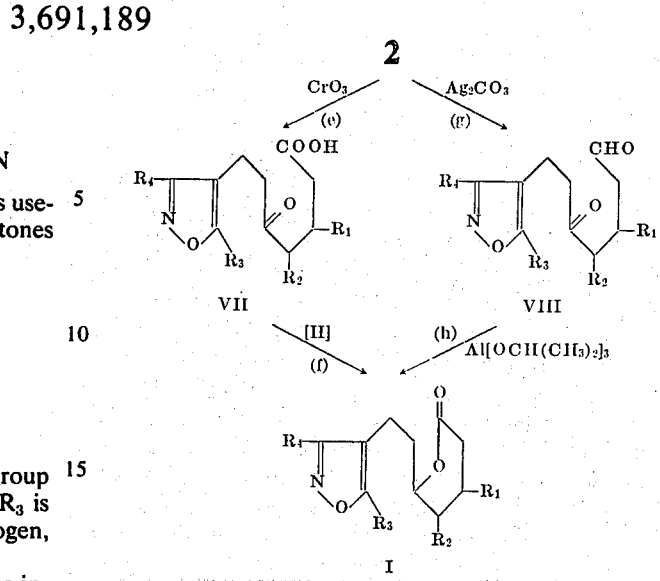

where $R_1$, $R_2$, $R_3$ and $R_4$ are as above, $R_5$ taken independently is hydrogen or lower alkyl; $R_6$ taken independently is lower alkyl or aralkyl and $R_5$ and $R_6$ taken together with the adjacent nitrogen atom form a five or six membered saturated heterocyclic ring including at the most one additional hetero atom selected from the group consisting of nitrogen and oxygen.

The reaction sequence outlined in the above reaction scheme utilizes either amino ketones of the structure shown in formula II A or vinyl ketones of formula II B as alternative starting materials. It is to be noted that when the amino ketones of formula II A are placed in solution some of this compound is converted to the vinyl ketone of formula II B. Either type of compound or mixtures thereof can be used as starting material. The amino moiety represented by $R_5R_6N-$ in formula II A can be a lower alkyl amine such as methylamine, ethylamine, propylamine, n-butylamine, hexylamine, etc., preferably n-butylamine; aralkyl-amines such as α-methylbenzylamine or amines of complex molecules such as, for example, dehydroabietylamine. Suitable amino groups also include di-lower alkylamines which may optionally contain additional substituents on the alkyl group, e.g., phenyl or cyclic amino groups. Examples of such di-substituted amines include dimethylamine, diethylamine, methylethylamine and the like. Diethylamine is preferred. The amino moiety may also comprise a cyclic group optionally containing an additional hetero atom in the ring. Examples of cyclic amines include pyrrolidine and piperidine. Morpholine is an example of a cyclic amine having an additional hetero atom.

The preparation of starting materials of formula II A is described in some detail in U.S. patent application Ser. No. 834,547, filed June 18, 1969, inventor Gabriel Saucy, and also in Ser. No. 830,491, filed June 4, 1969, inventor Gabriel Saucy.

In step (a) compounds of formula II A and/or II B are reacted with an α,γ-diketone compound of the following formula

where $R_3$ and $R_4$ are as above.

This reaction is conveniently conducted at a temperature in the range of from about 0° to 150° C., most preferably at the reflux temperature of a suitably high boiling inorganic solvent. Suitable inert organic solvents for this purpose include aromatic hydrocarbons, most preferably xylene or toluene. The reaction product obtained is a compound of formula III which as indicated in the above reaction scheme is believed to exist as a complex equilibrium mixture containing the two structures shown. Infrared and nuclear magnetic resonance spectra indicate that the predominate form in this equilibrium is the form indicated by subformula III A. However, it is understood that this equilibrium can be shifted by changes in the ambient conditions such as temperature, solvent system and the pH of the solution. The exact structure of compounds of formula III is not believed to be critical to the practice of the present invention. It is also possible to use compounds of formula III in crude form for such further transformations.

Compounds of formula III are then treated with hydroxylamine or a salt thereof in step (b) to yield mixed isomers of the bis-oxime of formula IV. This reaction is conveniently conducted at a temperature in the range of from about 0° to 100° C., most preferably at about room temperature. Suitable salts of hydroxylamine include the mineral acid salts of hydroxylamine, most preferably the hydrochloride salt. The reaction is most desirably conducted in the presence of an organic base, most preferably a tertiary amine such as a tri-lower alkylamine, e.g., triethylamine or pyridine.

In step (c) the bis-oxime of formula IV is converted by heating to the isoxazole oxime of formula V. Suitable solvents for use in this transformation step include organic solvents having a boiling point above about 50° C., most preferably above about 80° C. and include, for example, aromatic hydrocarbons such as benzene, toluene and xylene or halogenated aromatic hydrocarbons such as chlorobenzene. Generally, the reaction is most desirably conducted at the reflux temperature of the solvent medium. Compounds of formula V need not be purified prior to undergoing the next process step in the reaction scheme.

In step (d) compounds of formula V are subjected to aqueous acid hydrolysis to yield compounds of formula VI represented by the tautomeric equilibrium structure. Particularly suitable aqueous acids for use in this hydrolysis step include the mineral acids, e.g., sulfuric acid and hydrochloric acid. The hydrolysis may also be performed in the presence of a hydroxylamine scavenger, e.g., pyruvic acid. A most preferred aqueous acid for this purpose is dilute sulfuric acid, e.g., 1N sulfuric acid. The hydrolysis reaction may conveniently be conducted at a temperature in the range of from about 0° to 80° C., most preferably at about room temperature. The reaction may also be conducted in the presence of of an added inert organic solvent. Suitable solvents for this purpose include ketones such as acetone, methylethyl ketone and the like; lower alkanols such as methanol and ethanol; cyclic ethers such as tetrahydrofuran, dioxane, etc. Acetone is the solvent of preference for this purpose.

The compounds of formula VI may be converted into the desired compounds of formula I by means of two alternative pathways. In the first of these pathways the compounds of formula VI are oxidized in step (g) to yield the isoxazolyl keto acid of formula VII. This oxidation reaction is conducted in the presence of a chemical oxidizing agent such as, for example, Jones reagent, e.g., chromium trioxide in sulfuric acid and acetone at a temperature in the range of from about −10° C. to +50° C., most desirably the aforesaid oxidation step can be practiced on the reaction mixture obtained from hydrolysis step (d) above without necessitating isolation or purification of the compounds of formula VI produced therein. Thus, in a most preferred embodiment of this process step the oxidizing agent, e.g., Jones reagent is added directly to the reaction mixture obtained from step (d) subsequent to the completion of the hydrolysis reaction.

Compounds of formula VII are then reduced and cyclized to the desired compounds of formula I via process step (f) in a manner known per se. The reduction of the keto group of compounds of formula VII may be accomplished utilizing conventional reducing agents for this purpose. Reducing agents useful in this process step include the complex metal hydrides, e.g., alkali metal borohydrides, preferably sodium borohydride. The reduction can also be effected using catalytic hydrogenation such as with Raney-nickel as catalyst in a lower alkanol at a temperature in the range of from about 0° to 100° C., preferably at about room temperature at normal pressure.

The borohydride reduction reaction is conveniently conducted in a suitable inert organic solvent such as, for example, lower alkanols, such as methanol, ethanol or preferably isopropanol; aqueous cyclic ethers such as tetrahydrofuran or dioxan. The borohydride reduction reaction is conducted at a temperature in the range of from about −50° to +50° C., most preferably in the range of from about −10° to +25° C.

The cyclization step can proceed spontaneously in the above reaction media, but most preferably can be promoted by subsequent heating, e.g., at reflux in an aromatic hydrocarbon, e.g., toluene or by addition of an acid, e.g., a mineral acid.

In an alternate and preferred route, compounds of formula VI are converted to compounds of formula I by means of a series of novel intermediate reaction steps. Thus, in step (g) compounds of formula VI are treated with an oxidizing reagent comprising silver carbonate at elevated temperatures to yield the keto aldehyde of formula VIII. This reaction is conveniently conducted in an inert organic solvent, most preferably an aromatic hydrocarbon, e.g., toluene, xylene or benzene. The reaction is run at a temperature in the range of from about 20° C. to the reflux temperature of the reaction medium, most preferably at the reflux temperature of the reaction medium.

The keto aldehyde of formula VIII may the be converted to the desired product of formula I by treating the former compound with a metal alkoxide, preferably at the same conditions employed in step (g). It is therefore desirable to conduct both steps concurrently in a single reaction vessel. Suitable metal alkoxides useful in the practice of step (h) include the aluminum lower alkoxides and sodium lower alkoxides, e.g., aluminum isopropoxide and sodium methoxide. Aluminum isopropoxide is the agent of greatest preference for this purpose.

Compounds of the formulas III, IV, V, VI, and VIII above are novel intermediates and as such form a part of the present invention. Preferred embodiments of the process and compound aspects of the present invention are obtained when $R_1$ and $R_2$ both are hydrogen, $R_3$ and $R_4$ both are lower alkyl, most preferably methyl, and $R_5$ and $R_6$ both are lower alkyl, most preferably ethyl.

The conversion of compounds of formula I into 19-nor steroids of known pharmacological value is described in detail in U.S. patent application Ser. No. 778,314, filed Nov. 22, 1968, inventors Gabriel Saucy and John William Scott.

The present invention will be more clearly understood by reference to the following examples.

EXAMPLE 1

Preparation of 2-(2-diethylaminoethyl)-2-hydroxytetrahydropyran

In a 3-liter, three-necked flask fitted with a mechanical stirrer and reflux condenser there was dissolved 25.2 g. of 6-heptene-1,5-diol in 700 ml. of 1,2-dichloroethane. The solution was maintained under a nitrogen atmosphere and 100 ml. of diethylamine and 208 g. of activated manganese dioxide were added with cooling from an ice bath. The reaction mixture was then stirred at room temperature under an atmosphere of nitrogen for 1 day. The solution was filtered and the filter was washed well with benzene. The combined filtrates were evaporated at 40° C. under 20 mm Hg and finally at 1 mm Hg to yield 34.6 g. of the above product as a dark brown oil.

A total of 31.6 g. of the above crude material was dissolved in 50 ml. of ethyl acetate and treated with 200 ml. of 1.2 N hydrochloric acid. After extracting the aqueous phase 3 times with 100 ml. each the portions of ethyl acetate, the aqueous phase was brought to pH 11 with ice cooling using 30 ml. of 1N sodium hydroxide. The resulting solution was extracted with 4 × 300 ml. each of benzene and the combined benzene layers were dried over sodium sulfate, filtered and then evaporated in vacuo to dryness. Pure 2-(2-diethylaminoethyl)-2-hydroxytetrahydropyran was obtained as an oil in a yield of 25.3 g. (71 percent). A sample was further purified by passing through a column of alumina (III) and eluting with benzene. Evaporation of the solvent yielded an analytical sample of the aforesaid pure product.

$C_{11}H_{23}NO_2$ (201.30) Calcd. C, 65.63; H, 11.52; N, 6.96
Found C, 65.80; H, 11.52; N, 6.69.

EXAMPLE 2

3-Acetyl-10-hydroxy-2,6-decanedione

In a 500 ml. round bottom flask fitted with a regular condenser there was added 25.3 g. of 2-(2-diethylaminoethyl)-2-hydroxytetrahydropyran dissolved in 250 ml. of toluene and 25 ml. of 2,4-pentanedione. The mixture was stirred and refluxed under nitrogen for 6½ hours. It was then cooled to room temperature and concentrated at approximately 50° C. at ° mm Hg and finally at 1 mm Hg at approximately 35° C. There was obtained 31.5 g. of crude product as a yellowish oil. A sample of the crude material was chromatographed on silica gel and crystallized from ether to give pure 3-acetyl-10-hydroxy-2,6-decanedione, m.p. 65°–68 C.

$C_{12}H_{20}O_4$ (228.28) Calcd. C, 63.13; H, 8.83
Found C, 62.86; H, 8.82.

EXAMPLE 3

Preparation of 1-(3,5-dimethyl-4-isoxazolyl)-7-hydroxy-3-hydroxyimino-heptane

A total of 31.5 g. of crude 3-acetyl-10-hydroxy-2,6-decanedione dissolved in 250 ml. of ethanol (2B) was reacted with 30 g. of triethylamine and 17.6 g. of hydroxylamine hydrochloride with stirring and cooling (ice bath). After stirring at room temperature overnight, the solvents were evaporated at 40° C. under 20 mm Hg. The yellowish residue comprising mixed isomers of 3-acetyl-10-hydroxy-2,6-dihydroxyimino-decane containing some triethylamine hydrochloride was dissolved in 250 ml. of toluene and refluxed for three and one-half hours with stirring. After evaporating the solvent at about 50° C. under 20 mm Hg, the residue obtained was taken up in 300 ml. of chloroform and extracted with 2 × 100 ml. of distilled water. The organic phase was dried over anhydrous sodium sulfate, filtered and evaporated at 40° C. under 20 mm Hg and finally under 1 mm Hg to afford 25.8 g. of crude 1-(3,5-dimethyl-4-isoxazolyl)-7-hydroxy-3-hydroxyimino-heptane as a dark brown oil. A sample of this material was chromatographed on silica gel using 1:1 ether-ethyl acetate to elute the product as an oil in analytically pure form.

$C_{12}H_{20}N_2O_3$ (240.30) Calcd. C, 59.98; H, 8.39; N, 11.66

Found C, 59.78; H, 8.69; N, 11.66.

EXAMPLE 4

Preparation of 1-(3,5-dimethyl-4-isoxazolyl-7-hydroxy-3-heptanone

A total of 25.8 g. of crude 1-(3,5-dimethyl-4-isoxazolyl)-7-hydroxy-3-hydroximino-heptane was dissolved in 200 ml. of acetone containing 26 ml. of of 1N sulfuric acid and stirred at room temperature overnight. The resulting solution contains crude 1-(3,5-dimethyl-4-isoxazolyl)-7-hydroxy-3-heptanone and may be utilized per se in further transformation steps.

An analytical sample of the above product may be obtained by neutralization of the above reaction mixture with sodium carbonate, evaporation of the solvent, extraction with chloroform and separation and evaporation of the organic phase. The residue obtained is crystallized from ether-hexane to yield pure product, m.p. 51°–53° C.

$C_{12}H_{19}NO_3$ (225.27) Calcd. C, 63.98; H, 8.50; N, 6.22
Found C, 64.18; H, 8.78; N, 6.22.

EXAMPLE 5

Preparation of 7-(3,5-dimethyl-4-isoxazolyl)-5-oxo-heptanoic acid

To the reaction mixture containing 1-(3,5-dimethyl-4-isoxazolyl)-7-hydroxy-3-heptanone obtained in Example 4 there was added dropwise 60 ml. of Jones reagent at 20° C. with stirring. After stirring at room temperature for an additional 2 hours, the mixture was cooled with ice and a solution of sodium bisulfite was added until the solution turned green. The solvent was evaporated at 40° C. and at 20 mm Hg and the residue was saturated with solid sodium chloride and extracted with 4 × 100 ml. of ethyl acetate. The combined organic extracts were washed with 2 × 100 ml. of saturated sodium chloride solution. The organic phase was extracted with 4 × 70 ml. of 10 percent sodium carbonate solution. The aqueous extracts were combined and acidified with dilute sulfuric acid to a pH of 1. Extraction with 3 × 200 ml. of ethyl acetate followed by washing with saturated sodium chloride solution (100 ml.), drying over anhydrous sodium sulfate, filtration and evaporation of the solvents at 40° C. under 20 mm Hg and finally under 1 mm Hg yielded 11.1 g. of crude 7-(3,5-dimethyl-4-isoxazolyl)-5-oxo-heptanoic acid as a brown oil. Two crystallizations from ethyl-ether yielded pure product, m.p. 58°–61° C.

EXAMPLE 6

Preparation of 7-(3,5-dimethyl-4-isoxazolyl)-5-oxoheptanal

A total of 213 mg. of 1-(3,5-dimethyl-4-isoxazolyl)-7-hydroxy-3-heptanone was oxidized utilizing 2.17 g. of the silver carbonate-celite reagent described by Setizon et al., C. R. Acad. Sci., Paris Ser. C., 267, 900 (1968), in 10 ml. of refluxing toluene for 8 hours under a nitrogen atmosphere. Filtration and evaporation of the reaction mixture gave crude 7-(3,5-dimethyl-4-isoxazolyl)-5-oxoheptanal (185 mg.) which was chromatographed on alumina (III). Flution with hexane-benzene 1:1 gave pure product (114 mg.) as an oil. An analytically pure sample was prepared by microdistillation (short path, b.p. approx. 150° C. at 0.01 mm Hg).
$C_{12}H_{17}NO_3$ (223.26) Calcd. C, 64.55; H, 7.68; N, 6.27
Found C, 64.53; H, 7.63; N, 6.33.

EXAMPLE 7

Preparation of 7-(3,5-dimethyl-4-isoxazolyl)-5-hydroxy-heptanoic acid lactone

A. From 7-(3,5-dimethyl-4-isoxazolyl)-5-oxoheptanal

A total of 1.00 g. of crude 7-(3,5-dimethyl-4-isoxazolyl)-5-oxoheptanal was allowed to react for 2-½ hours with 200 mg of aluminum isopropoxide in 5 ml. of refluxing toluene. The reaction mixture was filtered and the filter washed with benzene. The combined organic solvents were evaporated in vacuo to give 0.79 g. of crude 7-(3,5-dimethyl-4-isoxazolyl)-5-hydroxy-heptenoic acid lactone the identity of which was established by comparison of thin-layer chromatogram, infrared spectrum and gas chromatographic analysis with authentic materials.

B. From 7-hydroxy-1-(3,5-dimethyl-4-isoxazolyl-4-heptanone

A total of 50.3 mg. of 7-hydroxy-1-(3,5-dimethyl-4-isoxazolyl)-3-heptanone was dissolved in 5 ml. of toluene and allowed to react for 8 hours at reflux under an atmosphere of nitrogen with 500 mg. of the silver carbonate-celite reagent identified in Example 6 and 50 mg. of aluminum isoxpropoxide. A total of 25.4 mg. of an oil was obtained after workup as in A above. This oil was shown by gas chromatographic analysis to contain 68.5 percent of 7-(3,5-dimethyl-4-isoxazolyl)-5-hydroxy-heptenoic acid lactone.

C. From 7-(3,5-dimethyl-4-isoxazolyl)-5-oxo-heptanoic acid

A solution containing 41.2 g. of 7-(3,5-dimethyl-4-isoxazolyl)-5-oxo-heptenoic acid in 600 ml. of isopropyl alcohol was placed under nitrogen. To this solution was carefully added 10.0 g. of sodium borohydride. After the initial vigorous reaction had subsided, the cloudy solution was heated at reflux overnight. The major portion of the solvent was then removed at reduced pressure. The residue was diluted with water, acidified with 1N hydrochloric acid, saturated with salt and extracted with ether. The ether solutions were washed with brine and dried over anhydrous sodium sulfate. Removal of solvent at reduced pressure gave 7-(3,5-dimethyl-4-isoxazolyl-5-hydroxyheptanoic acid. This material was heated to 220° C./0.3 mm Hg, at which time a colorless liquid was rapidly distilled. Crystallization from ether gave 7-(3,5-dimethyl-4-isoxazolyl)-5-hydroxyheptanoic acid lactone as white prisms, m.p. 61°–63° C.

I claim:

1. A process for the preparation of compounds of the formula

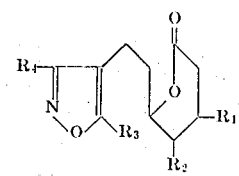

wherein $R_1$, $R_2$, and $R_4$ are selected from the group consisting of hydrogen and lower alkyl and $R_3$ is selected from the group consisting of hydrogen, lower alkyl, lower alkyl phenyl and phenyl lower alkyl which process comprises treating a compound of the formula

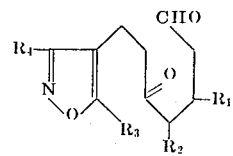

wherein $R_1$, $R_2$, $R_3$ and $R_4$ are as above
with a metal alkoxide selected from the group consisting of aluminum and sodium lower alkoxides at a temperature in the range of from about 20° C. to the reflux temperature of the reaction medium.

2. The process of claim 1 wherein said metal alkoxide is aluminum lower alkoxide.

3. The process of claim 2 wherein $R_1$ and $R_2$ both are hydrogen; $R_3$ and $R_4$ both are methyl, and said aluminum lower alkoxide is aluminum isopropoxide.

4. The process of claim 1 wherein said compound of formula VIII is obtained by treatment of a compound represented by the following tautomeric equilibrium formula

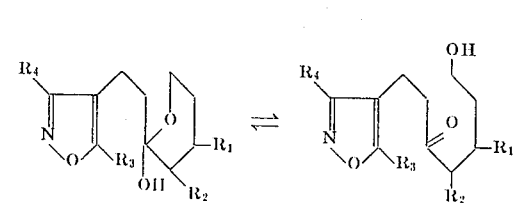

where $R_1$, $R_2$, $R_3$ and $R_4$ are as in claim 1 with an oxidizing reagent consisting essentially of silver carbonate.

5. A process for the preparation of a compound of the formula

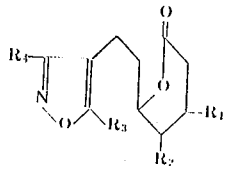

wherein $R_1$, $R_2$, and $R_4$ are selected from the group consisting of hydrogen and lower alkyl and $R_3$ is selected from the group consisting of hydrogen, lower alkyl, lower alkylphenyl and phenyl lower alkyl
which process comprises treating a compound of the formula

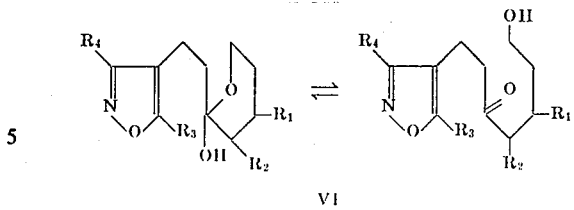

VI where $R_1$, $R_2$, $R_3$ and $R_4$ are as above
with a reaction medium comprising both an oxidizing reagent consisting essentially of silver carbonate and a metal alkoxide selected from the group consisting of aluminum and sodium alkoxides at a temperature in the range of about 20° C. to the reflux temperature of the reaction medium.

6. The process of claim 5 wherein said metal alkoxide is aluminum isopropoxide.

* * * * *